March 10, 1959 O. E. MATTIAT 2,877,432

ELECTROMECHANICAL FILTER ELEMENTS

Filed Jan. 8, 1957 2 Sheets-Sheet 1

INVENTOR.
OSKAR E. MATTIAT

BY [signature]

ATTORNEY

INVENTOR.
OSKAR E. MATTIAT
BY Francis L. Masselle
ATTORNEY

United States Patent Office 2,877,432 Patented Mar. 10, 1959

2,877,432

ELECTROMECHANICAL FILTER ELEMENTS

Oskar E. Mattiat, Cleveland, Ohio, assignor to Clevite Corporation, Cleveland, Ohio, a corporation of Ohio Application January 8, 1957, Serial No. 633,052

15 Claims. (Cl. 333—72)

This invention relates to frequency selective devices, and particularly to mechanical resonator elements utilized in wave-filters and the like.

For the purposes of illustration and example, the invention will be described herein as applied to band-pass filters operating in the intermediate frequency range, e. g., 400 to 500 kc.

Wave-filters and resonator elements utilized therein of the broad general type to which the present invention pertains are known to the art. Perhaps the best known filter of this kind is that which utilizes a plurality of small metal disks which are mechanically coupled through small wires and are magneto-strictively excited in a flexural mode of vibration. One of the primary disadvantages of this particular filter is that it is characterized by high insertion losses. As a class, filters of this type heretofore have been subject to this and/or one or more additional undesirable features including high cost, difficulty of fabrication, and asymmetrical frequency response.

It is the general object of the present invention to provide electromechanical wave-filter elements which overcome one or more of the disadvantages of comparable prior art devices.

Another object is the provision of electromechanical filter elements characterized by low insertion loss.

A further object is the provision of electromechanical filter elements for band-pass filters which impart to such filters high signal-to-noise ratios, and highly symmetrical pass band characteristics.

A still further object is the provision of electromechanical filter elements characterized as above which are relatively simple in construction, easy to fabricate and low in cost.

Another object of the invention is the provision of electromechanical filter elements which utilize the characteristically high electromechanical coupling coefficient of certain polarized ferroelectric ceramic materials.

These and further objects, the several advantages of the invention and the manner in which these objects and advantages are attained will be apparent to those conversant with the art from the following description and subjoined claims taken in conjunction with the annexed drawings in which Figure 1 is a perspective elevational view of one form of electromechanical filter element according to the invention;

Figure 1:
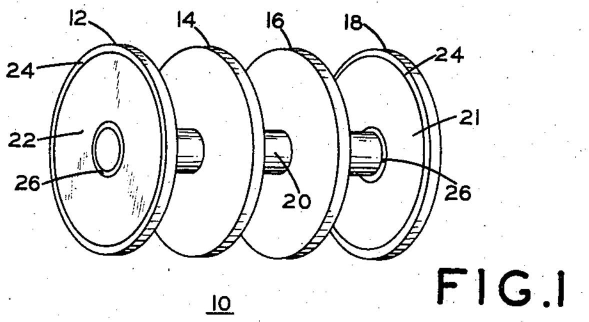

In accordance with the present invention, electromechanical wave-filter elements comprise a number of substantially discoid bodies each proportioned to have a resonance of mechanical vibrations in the radial mode at a predetermined frequency. The discoid bodies are juxtaposed in parallel coaxial relation and have central portions mechanically coupled to adjacent bodies. At least the two endmost bodies of the group are composed of a ferroelectric ceramic material which is capable of accepting and retaining a permanent remanent electrostatic polarization which imparts piezoelectric properties to it and these two bodies are poled in an axial direction. Electrode means are applied to opposed surfaces of each of the ceramic bodies.

Before describing in detail the physical aspects of devices according to the invention, the nature, properties and examples of the specific electromechanically responsive ceramic materials utilized therein will be disclosed. These materials, hereinafter referred to as polarizable ferroelectric ceramics, are generally well known in the art. They consist of polycrystalline aggregates of certain ceramic raw materials, formulated and fired to ceramic maturity in accordance with generally conventional ceramic techniques. For the most part these ceramics are characterized by a perovskite type crystal structure although this is not necessarily the case.

Well known examples of suitable materials are barium titanate and solid solutions of lead zirconate and lead titanate. These ceramics are ferroelectric and when conditioned, i. e., "poled" or "polarized" by the application of a strong electrostatic field, develop properties similar to the piezoelectric effect which is a natural characteristic of many crystalline materials, such as quartz and Rochelle salt. The manner of fabricating and polarizing barium titanate ceramic is disclosed in detail in U. S. Patent No. 2,486,560 to Gray. A similar disclosure with respect to lead zirconate titanate ceramic is made in U. S. Patent No. 2,708,244 to Bernard Jaffe.

It is important to note that ferroelectric ceramic bodies, when polarized, have certain properties which distinguish them from naturally piezoelectric materials such as quartz and Rochelle salt. First of all, the ceramics are characterized by a significantly higher coefficient of electromechanical coupling having planar coupling coefficients in the order of 50%. In addition, because of their ceramic nature, they are capable of being formed into desired shapes by simple fabricating procedures well known in the ceramic arts. One of the most important features of ferroelectric ceramic materials is the fact that they are isotropic in a plane perpendicular to the axis or direction of polarization. Disks of such ceramics, therefore, have both an axial (or thickness) and a true radial (or circumferential expansional) mode of vibration. The radial mode, which is essential to resonator elements according to the invention, does not exist as an isolated mode in quartz or even in single crystals of ferroelectric materials.

The particular ferroelectric ceramic employed will depend on design requirements for and operating conditions of the filter.

Substantially pure barium titanate and lead zirconate titanate ceramics are entirely usable materials for the purposes of the invention. A preferred material, because of its high mechanical Q (about 1500) is a mixture of barium titanate with about 12 weight percent calcium titanate. It is characteristic of many ferroelectric ceramics that the frequency constants, coupling coefficients and dielectric constants "age," i. e. increase or decrease with the passage of time and, further, are subject to variation in accordance with ambient temperature changes. Thus, for example, with the passage of time the frequency constant increases, the coupling coefficient decreases and the dielectric constant increases.

Ferroelectric ceramics in which aging and/or temperature dependence are minimized are available in the form of certain chemical modifications of lead zirconate titanate which are disclosed and claimed in copending applications for U. S. Letters Patent Serial Nos. 527,720, filed August 11, 1955, and 550,868 and 550,869, filed December 5, 1955, all of which are assigned to the same assignee as the present invention. Inasmuch as the physical and electrical properties rather than the chemical composition of the ceramic compositions is the important consideration and because further improvements in the materials undoubtedly will be made from time to time, the optimum properties to be used as criteria in the selection of ceramic materials will be listed in the order of their importance:

(1) Time and temperature stability of resonant frequency.

(2) High mechanical Q.

(3) Time and temperature stability of other properties, e. g., dielectric constant, mechanical Q.

(4) Relatively low dissipation.

(5) Substantial electromechanical coupling.

For the purposes of example and this disclosure, data given herein are based on the use of the preferred material, viz., $BaTiO_3$ containing 12 w. percent calcium titanate.

From the foregoing it will be appreciated that the present inventions contemplate the use, not only of the materials specifically disclosed, directly or by reference, but also any other ferroelectric ceramic materials now known or hereinafter discovered which possess the requisite properties.

Figure 2:
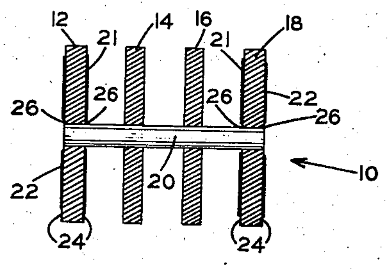
Figure 2 is a longitudinal axial section of the element shown in Figure 1.

Referring now to the drawings and first, particularly, to Figures 1 and 2, numeral 10 designates in its entirety one form of electromechanical filter element in accordance with the present invention. In the illustrated embodiment, element 10 comprises a group of discoid bodies 12, 14, 16 and 18 mounted coaxially in equispaced relation on a cylindrical axial rod 20. For ease of reference, the discoid bodies will be referred to simply as "disks" even though these bodies may not be disks in the precise geometric sense of the term. While any reasonable number of disks can be employed, two disks being the minimum, four are shown for the purposes of example. Of these, at least the endmost disks 12 and 18 are formed of a ferroelectric ceramic material such as hereinbefore described. The opposite major faces of end disks 12 and 18 are electroded in accordance with known techniques to provide on each disk an electrode pair consisting of an inner electrode 21 and an outer electrode 22. A small unelectroded margin 24 is provided between the electrodes and the edge of the respective disks to prevent shorting of the electrode pairs. A similar margin 26 isolates the electrodes from rod 20 under certain circumstances where the rod or its surface is electrically conductive.

Disks 12 and 18 are polarized in the thickness direction as hereinbefore explained. For this purpose the operating electrode pairs 21, 22 may be utilized and poling performed after the assembly 10 is complete or special poling electrodes (not shown) may be applied for use in poling and thereafter removed and replaced with operating electrodes 21, 22.

The spacing between the respective disks may be equal to one half the wavelength of longitudinal vibrations in rod 20 or, preferably, are placed as close together as practical from the standpoint of production problems and the distance between them small in comparison to said wavelength.

The diameter of rod 20 is selected to give the desired degree of mechanical coupling between the disks but in any event the rod diameter is small in comparison to the diameter of the disks. The maximum diameter of rod 20 would be about 30% of the diameter of the disks.

The intermediate disks 14 and 16 may be of the same ceramic material as end disks 12 and 18 but need not be polarized. Alternatively, they may be of a different ceramic material which, because no poling is necessary, need not be ferroelectric, or they may be of a suitable metal. One metal suitable for the intermediate disks is a nickel alloy commercially available under the trade name Ni-Span-C. It has a high mechanical Q and low temperature dependence of frequency. Further considerations governing the material of the intermediate disks will become apparent as this description proceeds.

To obtain a relatively narrow band-pass characteristic, all of the disks 12, 14, 16 and 18 are proportioned to exhibit a resonance of mechanical vibration in the radial mode at a predetermined frequency which substantially coincides with the center frequency of the pass band. For any given material the resonant frequency of the disks would be a function primarily of the diameter, provided disks of relatively small thickness dimension are used. The individual disks in a given filter element 10, having been proportioned to have at least approximately the same resonant frequency, can then be "tuned" more precisely to the same frequency by mass loading as, for example, by silver plating the circumferential edges of the disks and applying a thin layer of solder thereto. The unelectroded margins 24 function to electrically isolate the electrode pairs 21, 22 from and prevent short circuiting by the silver plating and solder on the circumference.

In the embodiment illustrated in Figures 1 and 2, the disks 12, 14, 16, 18 are actually annular in configuration and have the rod 20 passing through their central apertures. The rod 20 in such a case would, preferably, be of metal. In the interest of obtaining maximum efficiency in operation, the acoustic impedance of the material of rod 20 should match that of the disks as closely as feasible and compatible with other considerations. Fabrication of this embodiment could be accomplished, preferably, by shrink-fitting the bodies to rod 20. Thus the rod 20 can be chilled and the bodies heated prior to assembly; with a return to normal temperatures the expansion of the rod and contraction of the bodies produce an extremely good mechanical coupling which is an important requisite to optimum operating characteristics in the filter element 10.

Inasmuch as mechanical resonators such as disks 12, 14, 16 and 18 have, in addition to a fundamental resonance, a series of non-harmonic overtone resonances, this may result in a series of pass bands which are objectionable. These unwanted pass bands can be eliminated by utilizing disks operating at different orders of radial mode resonance, i. e., one or a number of the disks can be proportioned to respond in fundamental resonance at the preselected frequency and another one or number of disks proportioned to respond in a first or higher order overtone resonance at the same frequency. For example, a thin disk of $BaTiO_3$ containing 12% calcium titanate and having a diameter of 0.301 inch has a fundamental radial mode resonance at 450 kc., a first overtone at 1200 kc. and a second overtone at 1900 kc. whereas a disk of the same material having a 0.767 inch diameter has fundamental, first and second overtone resonances, respectively, at 168 kc., 450 kc. and 720 kc. It will be seen that the fundamental resonance of the 0.301 inch disk coincides with the first overtone of the larger (0.767 inch) disk. As will be more fully appreciated when the operation of the filter element 10 is described, this forms a pass band for 450 kc. and stop bands for all other frequencies.

As will be more fully explained in describing the operation of filter element 10, an A.-C. signal is applied to the electrodes of one end disk, e. g., 12 and the filtered signal is derived from the electrodes of the other end disk, i. e., 18. The electrical connections to filter element 10 for supplying and deriving, respectively, an input and output signal are, in themselves, conventional and optional. For example, referring to Figure 2, a double-ended input signal can be applied across electrodes 21, 22 of an end disk, say disk 12, and a double ended signal derived from the electrode pair of the other end disk, e. g., 18. Alternatively, one electrode of each pair can be connected to a common or ground potential. Thus, for example, inner electrodes 21 can be grounded and the input signal applied between electrode 22 of disk 12 and ground while the output is derived between electrode 22 of disk 18 and ground. Where rod 20 or at least its surface is conductive, grounding can be accomplished conveniently by extending the respective electrodes to be grounded into contact with the surface of the rod, i. e., by eliminating margins 26. If desired, an impedance transformation can be achieved by varying the ratio of the area of the input disk electrodes to that of the output disk electrodes.

The filter element 10 and those hereinafter described are mounted in any suitable manner; preferably they are disposed between resilient spring members (not shown) contacting the ends of rod 20.

The operation of filter element 10 as an I. F. (e. g., 455 kc.) band-pass filter is as follows: the input signal is applied, through suitable leads, not shown, to the electrode pair 21, 22 of one of the end disks, for example, disk 12. Due to the proportioning of disk 12, it is excited by the 455 kc. component of the signal and resonates in its radial mode at a frequency of 455 kc. As previously explained the resonance may be fundamental or an overtone, depending on the size of disk 12. Due to the Poisson effect, the rod is excited to longitudinal vibration at the same frequency. The longitudinal vibration of the rod is transmitted to disk 14 which is thus excited to radial mode resonance at 455 kc. which may be the fundamental or an overtone vibration for disk 14. In this manner, all of the disks are excited to a resonant condition at the selected frequency which frequency is passed by the filter while all others are attenuated. The resonant radial vibration of the final or output disk (18) generates an output signal at the desired pass frequency which appears across its electrode pair 21, 22.

Figure 3:
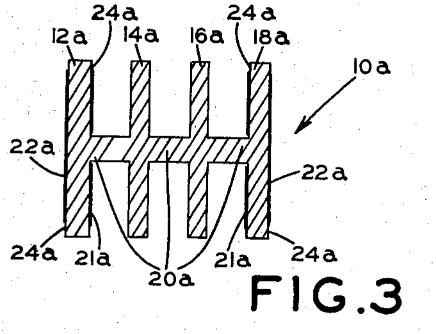
Figure 3 is a view similar to Figure 2 of a modified form of filter element, according to the invention.

A modified form of filter element according to the present invention is illustrated in Figure 3, designated in its entirety by reference numeral 10*a*. This modified form of filter element is in all respects identical with that previously described except that it is a mechanically non-composite structure constructed entirely of polarizable ferroelectric ceramic material such as hereinbefore described. Thus, each of the ceramic disk sections 12*a*, 14*a*, 16*a*, 18*a* are mechanically coupled by coaxial rod sections 20*a* which are formed integrally with the respective disk sections. As in the first described embodiment, only the end disks 12*a* and 18*a* are electroded and poled. Of course, the dielectric nature of rod sections 20*a* obviate the necessity for leaving inner margins such as 26, Figures 1 and 2, to insulate the electrode pairs and, therefore electrodes 21*a*, and 22*a* can be extended over the entire exposed disk surfaces except for the outer peripheral margins provided at 24*a*.

The ceramic piece of the configuration shown in Figure 3 can be fabricated by machining from a solid cylinder of the matured ceramic. Alternatively, a composite piece can be built from individual ceramic disks and rod sections 20*a* assembled together with solder or a suitable adhesive.

The functioning of filter element 10*a* is in all respects the same as described for filter element 10.

Figure 4:
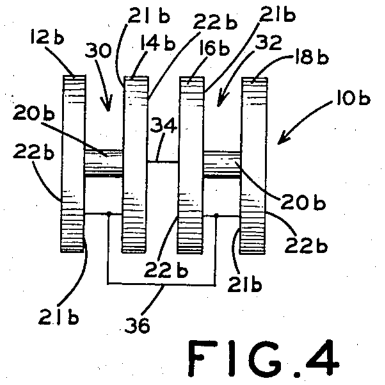
Figure 4 is a view similar to Figures 2 and 3 of another modified form of filter element in accordance with the invention.

While the embodiments of the invention thus far described comprise single filter elements all of the disks of which are mechanically coupled, the invention also contemplates a modification, illustrated in Figure 4, in which both mechanical and electrical coupling is employed. Thus, the filter element 10*b* in Figure 4 comprises two sections 30 and 32 each of which is made up of an assembly of disks mechanically coupled in spaced relation by coaxial rod. Specifically, filter element section 30 comprises two disks 12*b* and 14*b* coupled by rod 20*b* and section 32 comprises disks 16*b* and 18*b* also coupled by a rod 20*b*. While each section 30 and 32, as illustrated, has only two disks it is to be understood that any greater number may be used and that each section, individually, may take the form of any of the filter elements such as 10 and 10*a* hereinabove described and each is subject to the various modifications, optional variations and design considerations applicable to the previously described embodiments.

Inasmuch as filter element sections 30 and 32 each comprise only two disks, both are provided with suitable electrode pairs 21*b*, 22*b* although, in accordance with the foregoing description, if each section comprised 3 or more disks, only the end disks would be electroded and poled.

In Figure 4, the lines designated 34 and 36 represent an electrical connection of the electrodes of one end disk of each of the filter element sections 30 and 32. Specifically, as illustrated, the inner electrodes 21*b* of all the disks are electrically interconnected by conductor 36 and the outer electrodes 22*b* of end disks 14*b* and 16*b* are electrically connected by conductor 34.

In accordance with the previous explanation, the inner electrodes 21*b* of each section 30 and 32 may be conveniently grounded by extending them radially inwardly to the respective rod 20*b* which may be formed of or externally covered with electrically conductive material. In this case, conductor 36 may simply connect the respective rods 20*b*.

In consequence of the electrical connection therebetween, the sections 30 and 32 function effectively as a single filter element having four resonator disks except that the signal is transmitted from one section to the other by electrical impulses rather than mechanical vibrations. Thus, assuming that the input signal is applied to the electrodes of disk 12*b*, the resultant radial vibration is transmitted to the disk 14*b* by virtue of the mechanical coupling provided by rod 20*b*. The resonant radial vibration thus induced in disk 14*b* generates an electrical signal at the same frequency which appears across its electrodes and is transmitted by electrical connections 34 and 36 to the electrodes of disk 16*b* which is excited to radial resonance at the same frequency. Thereafter the signal is transmitted mechanically to the last disk 18*b* and the output signal derived from its electrodes.

One of the advantages of the filter element shown in Figure 4 is that it simplifies production, enabling the fabrication of relatively simpler individual units.

Figure 5:
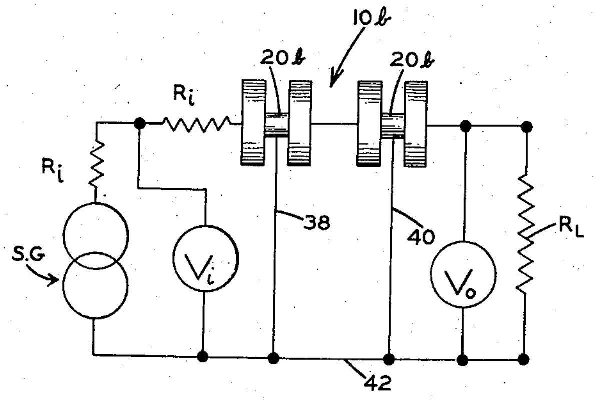
Figure 5 is a schematic test circuit including a filter element which is a variation to which those illustrated in the preceding figures are adaptable.

Figure 5 illustrates schematically a test circuit embodying the filter element shown in Figure 4. In the circuit, S. G. designates a signal generator or source and resistors $R_i$ represent the input impedance. An input voltmeter $V_i$ is connected across the signal source to measure the input voltage. The filter element 10*b* is provided with electrical connections as already described: the inner electrodes of each disk of each section 30 and 32 are grounded by a common connection through leads 38, 40 and 42 to one side of the signal source. It will be noted that the leads 38 and 40 are connected to the respective rods 20*b* of sections 30 and 32; as explained, these rods may be and, to use the particular wiring shown in Figure 5 must be formed of or covered with electrically conducting material which is in contact with the inner electrodes.

The output signal from the filter element appearing across load impedance $R_L$ is measured by a voltmeter $V_o$. The ratio in the reading of voltmeters $V_i$ and $V_o$ determines the insertion loss (I. L.) of the filter elements according to the formula $$I.L.=20\log_{10}\left[\left(\frac{V_i}{2V_o}\right)\sqrt{\frac{R_L}{R_i}}\right]$$

The frequency response of the filter element was tested by varying the frequency of the applied signal through a range extending above and below the design pass band frequency of the element.

Figure 6:
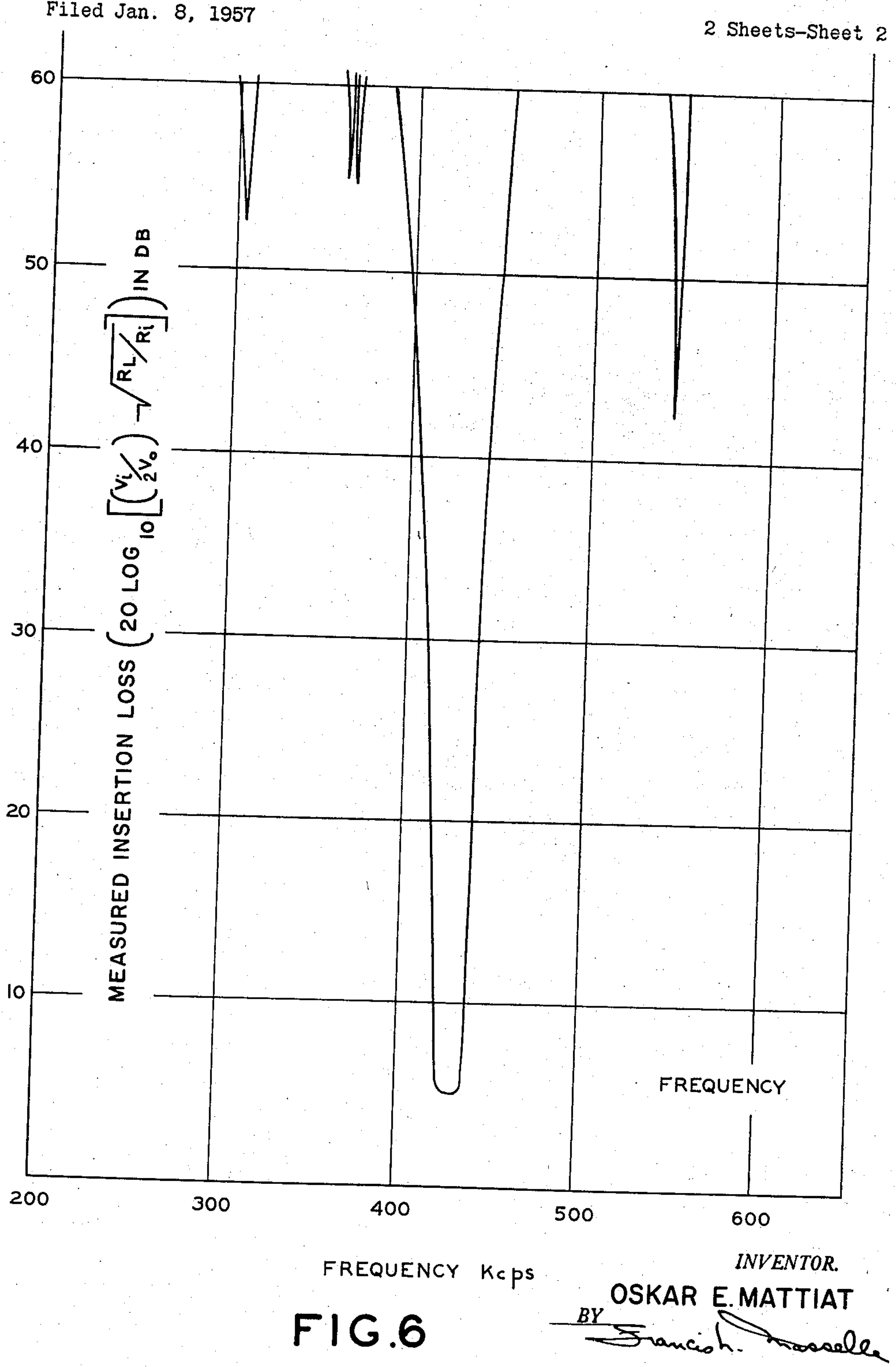
Figure 6 is a curve of measured insertion loss plotted against frequency typical of the performance of filter elements of the invention.

Typical of the frequency response characteristic of filter elements according to the present invention is the plot of insertion loss versus frequency shown in Figure 6. This particular response characteristic was obtained with a two-section filter element of the type shown and described in conjunction with Figure 4 and utilizing the test circuit illustrated in Figure 5. The filter was designed for a center frequency of 435 kc. The highly desirable features of the response curve and the filter characteristics which they represent will be readily apparent to those skilled in the art from Figure 6. The high signal-to-noise ratio and selectivity are particularly to be noted.

While there have been described what are at present considered to be the preferred embodiments of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electromechanical wave-filter element comprising a pair of discoid bodies of polarizable ferroelectric ceramic material each proportioned to have a radial mode resonance at a preselected frequency; electrode pairs conductively associated with each of said bodies; and means mechanically coupling corresponding central portions of said bodies and adapted to transmit vibrations from one to the other.

2. An electromechanical wave-filter element according to claim 1, said coupling means including at least one additional discoid body proportioned to have a radial mode resonance at said preselected frequency.

3. An electromechanical wave-filter element according to claim 2 wherein said radial mode resonance of said additional discoid body is a resonance of different order than that of at least one of said pair of discoid bodies.

4. An electromechanical wave-filter element according to claim 1, said coupling means comprising a cylindrical rod having a diameter small in comparison with diameters of said discoid bodies, said rod being coaxially disposed with respect to and having each end rigidly mechanically connected to one of said discoid bodies; and at least one additional discoid body coaxially mounted on and rigidly secured to said rod, said additional body being proportioned to have a radial mode resonance at said frequency.

5. An electromechanical wave-filter element comprising a group of at least two substantially discoid bodies at least two of which, endmost in the group, are composed of a polarizable ferroelectric ceramic and are poled in the axial direction, said bodies being proportional to have a resonance of mechanical vibration in the radial mode at a predetermined frequency; connecting means supporting said bodies in spaced coaxial relation and mechanically coupling the central portions thereof; and electrode means applied to the opposed major planar surfaces of each of said two bodies.

6. An electromechanical wave-filter according to claim 5 wherein the resonance of at least one discoid body is of different order than that of the other bodies of the group.

7. An electromechanical wave-filter element comprising an elongated rod, a group of discoid bodies mounted coaxially on said rod in equispaced relation, each of said bodies being proportioned to have a resonance of mechanical vibrations in the radial mode at a predetermined frequency, the endmost bodies of said group being composed of a polarizable ferroelectric ceramic material poled in the axial direction, the intermediate ones of said bodies being composed of a material having a relatively high mechanical Q and low temperature dependence of frequency; and electrode means applied to opposed surface of each of said endmost bodies.

8. An electromechanical wave-filter element comprising a non-composite structure of ceramic material, said structure consisting of a group of discoid portions spaced and interconnected in coaxial relation by small coaxial cylindrical coupling portions having a diameter small in comparison to that of said discoid sections, said ceramic material being a ferroelectric polycrystalline, aggregate susceptible of permanent electrostatic polarization to impart piezoelectric properties thereto, the endmost discoid portions of said group being poled in the axial direction and each having electrode means applied to opposed surfaces thereof, each of said discoid portions being proportioned to have a resonance of mechanical vibrations in the radial mode at a predetermined frequency.

9. An electromechanical wave-filter element comprising at least two component sections, each comprising a group of at least two discoid bodies each proportioned to have a resonance of mechanical vibrations in the radial mode at a predetermined frequency, the bodies of each group being juxtaposed in parallel, coaxial relation and having central portions mechanically coupled to adjacent bodies, at least the two endmost discoid bodies of each said group being composed of a ferroelectric ceramic material electrostatically poled in the thickness direction to impart piezoelectric properties thereto; electrode means on opposed surfaces of each of said two ceramic bodies of each of said groups; and means electrically connecting the electrode means of one of said bodies of one group to the electrode means of one of said bodies of the other group.

10. An electromechanical wave-filter element comprising a group of substantially discoid bodies each proportioned to have a resonance of mechanical vibrations in the radial mode at a predetermined frequency within a preselected range of frequencies, said bodies being juxtaposed in parallel, coaxial relation and having central portions mechanically coupled to adjacent bodies, at least two of said bodies, endmost in the group, being composed of polarizable ferroelectric ceramic material said two bodies being electrostatically poled in the axial direction; input electrode means associated with one of said two bodies for supplying a signal voltage thereto; and output electrode means associated with the other of said two bodies for deriving a signal voltage therefrom.

11. An electromechanical wave-filter element comprising a group of substantially discoid bodies each proportioned for mechanical resonance in the fundamental radial mode at a predetermined frequency, at least two of said bodies, endmost in the group, being composed of polarizable ferroelectric ceramic material, said two bodies being electrostatically poled in the axial direction; connecting means supporting said bodies in spaced, coaxial relation and mechanically coupling the central portions thereof; and electrode means applied to opposed surfaces of each of said two bodies.

12. An electromechanical wave-filter element comprising a group of at least two substantially discoid bodies at least two of which, endmost in the group, are composed of a polarizable ferroelectric ceramic and are electrostatically poled in the axial direction, at least one of said bodies being proportioned for fundamental mechanical resonance in the radial mode at a predetermined frequency, at least one other of said bodies being proportioned for overtone mechanical resonance in the radial mode at said predetermined frequency; connecting means supporting said bodies in equispaced, coaxial relation and mechanically coupling the central portions thereof; and electrode means applied to opposed surface of each of said two bodies.

13. An electromechanical wave-filter element comprising a cylindrical rod; a group of at least three substantially discoid bodies each proportioned to have a resonance of mechanical vibrations in the radial mode at a predetermined frequency within a preselected range of frequencies, said bodies being coaxially mounted on and rigidly secured to said rod in spaced relation, the spacing between said bodies being small in comparison to the wavelength of longitudinal vibrations in said rod, at least two of said bodies being composed of polarizable ferroelectric ceramic material, said two bodies being electrostatically poled in the axial direction; input electrode means associated with one of said two bodies for supplying a signal voltage thereto; and output electrode means associated with the other of said two bodies for deriving a signal voltage therefrom.

14. An electromechanical wave filter element comprising a plurality of substantially discoid bodies each proportioned for mechanical resonance in the fundamental radial mode at a predetermined frequency, at least two of said bodies being composed of a polarizable ferroelectric ceramic material, said two bodies being electrostatically poled in the axial direction; connecting means supporting said discoid bodies in spaced, coaxial relation and mechanically coupling the central portions thereof;

and electrode means applied to opposed surfaces of each of said two bodies.

15. An electromechanical wave-filter element comprising an elongated rod having an electrically conductive surface, a group of discoid bodies mounted coaxially on said rod in equispaced relation, each of said bodies being proportioned for mechanical resonance in the radial mode at a predetermined frequency, the endmost bodies of said group being composed of a polarizable ferroelectric ceramic material poled in the axial direction, electrode pairs applied to opposed surfaces of each of said endmost bodies, one electrode of each pair being electrically insulated from said rod, the other electrode of each pair being in electrical contact with the conductive surface of said rod.

References Cited in the file of this patent

UNITED STATES PATENTS

| | | |
|---|---|---|
| 2,592,703 | Jaffe | Apr. 15, 1952 |
| 2,617,882 | Roberts | Nov. 11, 1952 |
| 2,695,357 | Donley | Nov. 23, 1954 |
| 2,774,042 | Mason et al. | Dec. 11, 1956 |

OTHER REFERENCES

Hathaway et al., Proceedings of the I. R. E., vol. 45, No. 1, January 1957, pp. 5–16. (Copy in Scientific Library.)